(12) United States Patent
Reed et al.

(10) Patent No.: US 10,047,178 B2
(45) Date of Patent: Aug. 14, 2018

(54) MITIGATION OF CATALYST INHIBITION IN OLEFIN POLYMERIZATION

(71) Applicant: ExxonMobil Chemical Patents Inc., Baytown, TX (US)

(72) Inventors: Aaron H. Reed, League City, TX (US); Periagaram S. Ravishankar, Kingwood, TX (US); Florin Barsan, Pearland, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/426,670

(22) Filed: Feb. 7, 2017

(65) Prior Publication Data

US 2017/0145129 A1   May 25, 2017

(51) Int. Cl.
| | | |
|---|---|---|
| *C08F 210/18* | (2006.01) | |
| *C08F 6/02* | (2006.01) | |
| *C08F 2/04* | (2006.01) | |
| *C08F 6/00* | (2006.01) | |
| C08F 210/02 | (2006.01) | |

(52) U.S. Cl.
CPC ............ *C08F 210/18* (2013.01); *C08F 6/001* (2013.01); *C08F 6/02* (2013.01)

(58) Field of Classification Search
CPC .. C08F 2/04; C08F 6/001; C08F 6/002; C08F 2500/25; C08F 2500/26
USPC ......................................................... 528/496
See application file for complete search history.

(56) References Cited

U.S. PATENT DOCUMENTS

| | | | |
|---|---|---|---|
| 2,653,959 A | 9/1953 | Moore et al. | |
| 3,117,095 A | 1/1964 | Brown et al. | |
| 3,489,808 A | 1/1970 | Eberly, Jr. | |
| 3,631,007 A * | 12/1971 | Diliddo ................ | C08F 6/02 526/169.2 |
| 3,753,960 A * | 8/1973 | Easterbrook .......... | C08F 210/00 526/282 |
| 3,931,350 A | 6/1976 | Sparks | |

(Continued)

FOREIGN PATENT DOCUMENTS

| | | |
|---|---|---|
| EP | 1022056 A | 7/2000 |
| WO | 02/06188 | 1/2002 |

(Continued)

OTHER PUBLICATIONS

Osokin, Petroleum Chemistry, vol. 47, pp. 1-11 (2007). "Vinylnorbornene: Preparation, Chemical Transformations, and Use in Organic Synthesis and Polymer Chemistry. Vinylnorbornene Synthesis and Isomerization to Eihylidenenorbornene (Review)".

(Continued)

*Primary Examiner* — Fred M Teskin

(57) ABSTRACT

This disclosure relates to a process for polymerization, and in particular to minimizing undesired polymerization reactions downstream of a polymerization reaction zone, for instance by use of a quenching agent that enables fast reaction rates with active polymerization catalyst in the polymerization effluent, so as to quench the catalyst quickly, thereby preventing uncontrolled polymerization reactions. A preferred quenching agent is methanol. Also provided are means for treating polymer recycle streams containing oxygenates, which may result from the use of such quench agents, particularly in polymerization processes including polyene (e.g., diene) monomers.

10 Claims, 2 Drawing Sheets

(56) References Cited

U.S. PATENT DOCUMENTS

| | | |
|---|---|---|
| 4,337,156 A | 6/1982 | deRosset |
| 4,465,870 A | 8/1984 | Herskovits |
| 5,245,107 A | 9/1993 | Yon et al. |
| 5,326,855 A | 7/1994 | Kahn |
| 5,338,824 A | 8/1994 | Diaz et al. |
| 5,427,689 A | 6/1995 | Kallenbach et al. |
| 6,051,631 A | 4/2000 | Hottovy |
| 6,111,162 A | 8/2000 | Rossini et al. |
| 6,632,766 B2 | 10/2003 | Kanazirev |
| 6,987,152 B1 | 1/2006 | Eisinger et al. |
| 7,102,044 B1 | 9/2006 | Kulprathipanja et al. |
| 7,141,630 B2 | 11/2006 | Vizzini et al. |
| 7,141,631 B2 | 11/2006 | Murakami et al. |
| 7,326,821 B2 | 2/2008 | Risch et al. |
| 7,368,618 B2 | 5/2008 | Kulprathipanja et al. |
| 7,576,248 B2 | 8/2009 | Kulprathipanja et al. |
| 9,382,344 B2 | 7/2016 | Ho et al. |
| 2002/0147377 A1 | 10/2002 | Kanazirev |
| 2004/0072972 A1 | 4/2004 | Vizzini et al. |
| 2004/0254416 A1 | 12/2004 | Risch et al. |
| 2009/0312511 A1 | 12/2009 | Ravage et al. |
| 2010/0197989 A1 | 8/2010 | Ducreux et al. |
| 2011/0079145 A1 | 4/2011 | Dolan et al. |
| 2014/0378732 A1* | 12/2014 | Ho .............. C08F 36/04 585/864 |
| 2016/0229930 A1* | 8/2016 | Price .............. C08F 6/003 |

FOREIGN PATENT DOCUMENTS

| | | |
|---|---|---|
| WO | 2004/033507 | 4/2004 |
| WO | 2008/010962 | 1/2008 |
| WO | 2008/013519 | 1/2008 |
| WO | 2009/010666 | 1/2009 |

OTHER PUBLICATIONS

Shchapin et al., Petroleum Chemistry, vol. 48, pp. 71-82, 2008, "Chemical Behavior of 5-Vinyl-2-Norbornene, 5-Ethylidene-2-to Norbornene, and Related Compounds as a Key to Understanding Specifics of Radiation-Chemical Processes: 3. The Structure of 5-Vinyl-2-Norbornene and 2-Vinylnorbornane Radical Cations".

* cited by examiner

MITIGATION OF CATALYST INHIBITION IN OLEFIN POLYMERIZATION

FIELD OF THE INVENTION

The present disclosure relates to polymerization processes, and in particular to the use of catalyst quenching agents in polymerization processes.

BACKGROUND OF THE INVENTION

It is believed that one source of contamination in polymer product comes from polymer produced downstream of a polymerization reactor, under conditions (e.g., temperature, pressure, and/or monomer concentration) different from the controlled conditions of the polymerization reactor. Such contaminant polymers, produced under different conditions, typically have molecular weight and composition different than the bulk polymer produced in the intended polymerization reaction zone. It is hypothesized that these contaminant polymers are produced at least in part owing to still-active polymerization catalyst remaining in a polymerization effluent leaving the polymerization reactor. These contaminant polymers can cause many problems, such as fouling in the polymerization reactor system (particularly in conduits and units downstream of the reactor), or they can result in surface defects in products made from the polymer product. For instance, copolymer elastomers, such as ethylene-α-olefin-polyene elastomers (e.g., ethylene-propylene-diene or EPDM rubbers) may be formed into articles, such as extruded weatherseals. Such articles may contain areas of polymer with different physical properties from the bulk product, and manifest as a defect in the article.

Quenching agents are frequently added just downstream of a polymerization reaction zone in an attempt to address this problem. Quenching agents are compounds that react with polymerization catalysts so as to deactivate the catalysts, thereby halting undesired downstream polymerization reactions.

Some references of potential interest with regard to this problem include: U.S. Pat. Nos. 2,653,959; 2,943,105; 3,489,808; 3,931,350; 4,337,156; 5,245,107; 5,326,855; 5,427,689; 6,051,631; 6,111,162; 6,118,037; 6,632,766; 6,790,344; 6,987,152; 7,102,044; 7,141,630; 7,141,631; 7,326,821; 7,368,618; 7,576,248; and 9,382,344; U.S. Patent Application Publication Nos. 2002/147377; 2004/0254416; 2009/0312511; 2010/0197989; and 2011/0079145; European Patent Application Publication No. 1022056A; PCT Publication Nos. WO 2002/06188; WO 2004/033507; WO 2008/010962; WO 2008/013519; and WO 2009/010666; and Yu G. Osokin, 47, PETROLEUM CHEMISTRY, pp. 1-11 (2007), and 48, PETROLEUM CHEMISTRY, pp. 71-82 (2008).

However, quenching agents, particularly water, frequently fail to deactivate the polymerization catalyst quickly enough. Some degree of uncontrolled polymerization reactions still persist downstream of the polymerization reactor.

SUMMARY OF THE INVENTION

Quenching agents with faster reaction rates (e.g., faster reaction rate constants and/or greater diffusivity in the post-polymerization reaction medium) are needed to quench polymerization catalysts more quickly, thereby minimizing post-reactor polymerization reactions.

Surprisingly, the present inventors have found that methanol makes for an excellent quenching agent, particularly in a solution polymerization process employing organic polymerization solvent such as isohexane. Methanol is a slightly stronger acid than the conventional quenching agent water, and it furthermore is more soluble in the organic solvent (and therefore is believed to diffuse through the medium more quickly). According to some further aspects of the invention, the quenching agent may comprise one or more other low-carbon alcohols (e.g., ethanol, propanol, or butanol) instead of, or in addition to, methanol. However, methanol is preferred among all these, due to its favorably fast reaction rates with remaining polymerization catalyst in the polymerization effluent. It is believed that these fast reaction rates quench the catalyst quickly enough to minimize gel formation (e.g., formation of off-spec polymer due to uncontrolled reactions polymerized by the catalyst in the polymerization effluent). This effect may be apparent, e.g., by examining extruded product made from the polymer for surface defects (as indicated, e.g., by gel count on the surface of such extruded products).

Nonetheless, particularly in polymerizations in which unreacted polyene monomers (e.g., conjugated or non-conjugated diene monomers) are present, using stronger acids (such as methanol, as compared to water) can create other problems. For instance, as discussed in U.S. Pat. No. 9,382,344, acid-catalyzed reaction of dienes and quenching agent may create undesirable organic oxygenates ("oxygenates", including aldehydes, carboxylates, alcohols, ketones, esters, and ethers), which may later find their way into the polymerization reactor (e.g., by a recycle stream) and reduce the catalyst activity in the polymerization reactor. However, as also discussed in the '344 patent, one or more adsorbent beds may be used to remove these oxygenates from any such recycle stream so as to mitigate adverse consequences of the stronger-acid quenching agent. Particularly, preferred adsorbent beds for removing oxygenates include a hybrid zeolitic material in alumina, and/or high purity silica, optionally with the addition of another alumina adsorbent.

Accordingly, the invention in some aspects resides in a polymerization process and/or a polymerization reaction system including: polymerizing one or more monomers in a polymerization reaction zone in the presence of a polymerization catalyst; drawing a polymerization effluent from the polymerization reaction zone (such effluent comprising polymer product, unreacted monomers selected from the aforementioned one or more monomers, and polymerization catalyst); and adding a quenching agent to the polymerization effluent, thereby obtaining a quenched polymer stream. The quenching agent may be methanol, ethanol, propanol, butanol, and/or mixtures thereof, but most preferably, the quenching agent is methanol. Further, the polymerization process is preferably a solution polymerization process (i.e., such that the polymerizing includes feeding a polymerization solvent into the polymerization reaction zone, and such that the polymerization reaction effluent further comprises the polymerization solvent). Suitable polymerization solvents include isohexane, hexane, cyclohexane, or other suitable hydrocarbon solvents for polymerization processes.

Processes according to some aspects may further include separating the quenched polymer stream into a polymer product stream and a polymer recycle stream; and contacting at least a portion of the recycle stream with one or more adsorbent beds to produce a treated recycle stream.

In particular embodiments, the one or more monomers include one or more conjugated or non-conjugated polyene monomers (e.g., one or more dienes, such as 5-ethylidene-2-norbornene ("ENB")). The one or more monomers may further include ethylene and propylene (e.g., as would be the case in a process to make EPDM rubber from ethylene, propylene, and diene monomers). In various of these embodiments, the polymer recycle stream may comprise quenching agent, one or more $C_6$ to $C_{12}$ conjugated or non-conjugated diene monomers, and one or more $C_1$ to $C_{40}$ oxygenates; and the absorbent bed may comprise at least two adsorbents to remove the quenching agent and/or $C_1$ to $C_{40}$ oxygenates.

DETAILED DESCRIPTION

Figure 1:
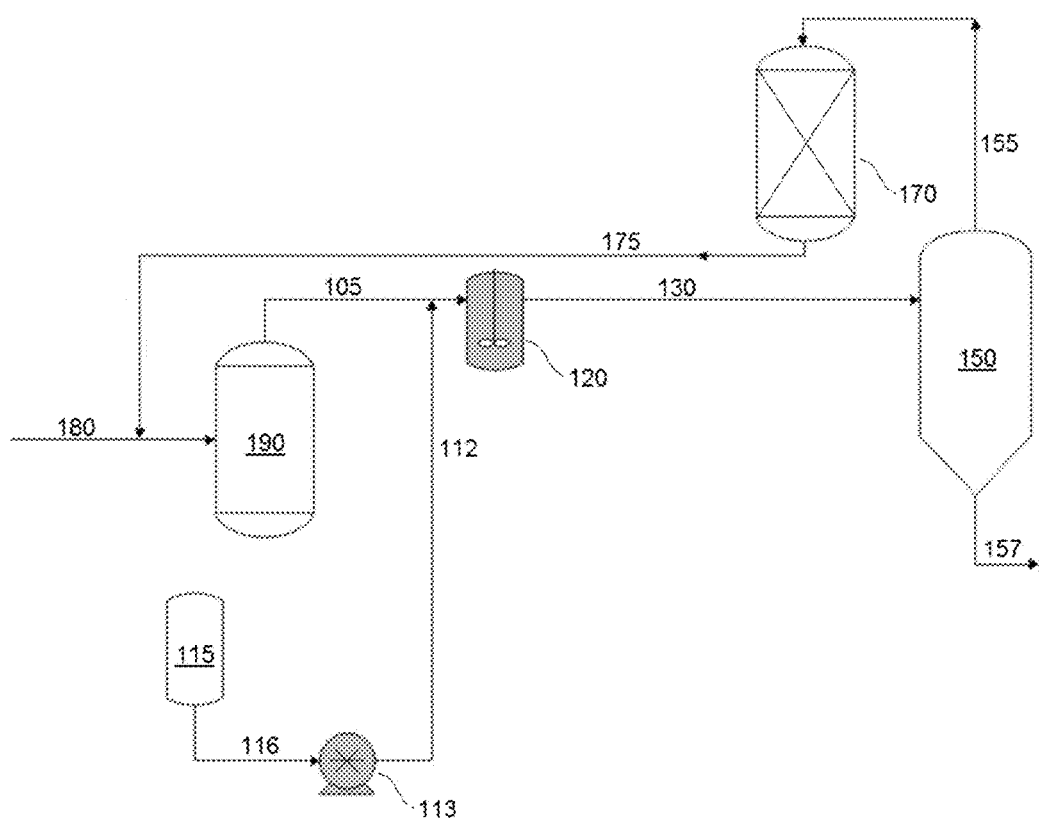
FIG. 1 shows portions of a polymerization reaction system in accordance with some embodiments.

Described herein are various embodiments, including embodiments relating to a process for polymerization, and in particular solution polymerization. Such a process may include feeding one or more monomers and a polymerization solvent to a polymerization reaction zone, polymerizing at least a portion of the one or more monomers in the presence of a polymerization catalyst in the polymerization reaction zone, withdrawing a polymerization effluent from the reaction zone, and adding a quenching agent to the polymerization effluent so as to obtain a quenched polymer stream. The quenching agent is methanol, ethanol, propanol, and/or butanol (i.e., a $C_1$ to $C_4$ alcohol); preferably, it is methanol (i.e., $C_1$ alcohol). Processes may further include recovering solid polymer product from the quenched polymer stream. The quenching reaction may proceed at a quenching rate such that the solid polymer product has desirably low gel count.

Monomers

The one or more monomers are selected from α-olefin monomers and/or polyene monomers. The α-olefin monomers are preferably selected from among one or more $C_1$ to $C_{12}$ α-olefin monomers (e.g., ethylene, propylene, 1-butene, etc.). Preferably, the one or more monomers include ethylene and/or propylene. Most preferably they include both ethylene and propylene, although in other embodiments they may include two or more of ethylene, propylene, 1-butene, and 1-octene in any combination thereof.

Polyene monomers include especially conjugated or non-conjugated diene monomers. Examples of non-conjugated diene monomers include: 2-methyl-1,4-pentadiene, 3-methyl-1,4-pentadiene, 1,4-hexadiene, 1,5-hexadiene, 2-methyl-1,5-hexadiene 3-methyl-1,4-hexadiene, 4-methyl-1,4-hexadiene, 5-methyl-1,4-hexadiene, 1,5-heptadiene, 1,6-heptadiene, norbornadiene, 3,3-dimethyl-1,3-hexadiene, 4-ethyl-1,4-hexadiene, 5-methyl-1,4-heptadiene, 6-methyl-1,4-heptadiene, 1-vinylcyclohexene, 5-methylene-2-norbornene, 1,6-octadiene, 1,7-octadiene, 1,9-octadiene, 1,7-nondiene, 1,8-nonadiene, 5-vinyl-2-norbornene, 5-ethylidene-2-norbornene, 5-ethyl-1,4-heptadiene, 5-ethyl-1,5-heptadiene, 4-methyl-1,4-octadiene, 5-methyl-1,4-octadiene, 5-methyl-1,5-octadiene, 6-methyl-1,5-octadiene, 6-methyl-1,6-octadiene, 7-methyl-1,6-octadiene, 1,8-decadiene, 1,9-decadiene, 1,4-divinylcyclohexane, 1,3-divinylcyclohexane, dicyclopentadiene, 3,7-dimethyl-1,6-octadiene, 5,7-dimethyl-1,6-octadiene, 4-ethyl-1,4-octadiene, 5-ethyl-1,4-octadiene, 5-ethyl-1,5-octadiene, 6-ethyl-1,5-octadiene, 6-ethyl-1,6-octadiene, 4-methyl-1,4-nonadiene, 5-methyl-1,4-nonadiene, 5-methyl-1,5-nonadiene, 6-methyl-1,5-nonadiene, 6-methyl-1,6-nonadiene, 7-methyl-1,6-nonadiene, 7-methyl-1,7-nonadiene, 5-allyl-2-norbornene, 1,10-undecadiene, 6-propyl-1,6-octadiene, 4-ethyl-1,4-nonadiene, 5-ethyl-1,4-nonadiene, 5-ethyl-1,5-nonadiene, 6-ethyl-1,5-nonadiene, 6-ethyl-1,6-nonadiene, 7-ethyl-1,6-nonadiene, 5-methyl-1,4-decadiene, 5-methyl-1,5-decadiene, 6-methyl-1,5-decadiene, 6-methyl-1,6-decadiene, 7-methyl-1,6-decadiene, 7-methyl-1,7-decadiene, 8-methyl-1,7-decadiene, 8-methyl-1,8-decadiene, 9-methyl-1,8-decadiene, 1,11-dodecadiene, 6-butyl-1,6-octadiene, 5-ethyl-1,4-decadiene, 5-ethyl-1,5-decadiene, 6-ethyl-1,5-decadiene, 6-ethyl-1,6-decadiene, 7-ethyl-1,6-decadiene, 7-ethyl-1,7-decadiene, 8-ethyl-1,7-decadiene, 8-ethyl-1,8-decadiene, 6-methyl-1,6-undecadiene, 8-methyl-1,6-undecadiene, and combinations thereof.

More preferably, the $C_6$ to $C_{12}$ non-conjugated diene monomers are selected from the group consisting of: 2-methyl-1,4-pentadiene, 3-methyl-1,4-pentadiene, 1,4-hexadiene, 1,5-hexadiene, 2-methyl-1,5-hexadiene, 1,6-heptadiene, norbornadiene, 1,7-octadiene, 1-vinylcyclohexene, 1,8-nonadiene, 5-vinyl-2-norbornene, 5-ethylidene-2-norbornene, 1,9-decadiene, 3,7-dimethyl-1,6-octadiene, 5,7-dimethyl-1,6-octadiene, 1,10-undecadiene, 1,11-dodecadiene, 5-methylene-2-norbornene, 5-allyl-2-norbornene, 5-vinyl-2-norbornene, 5-ethylidene-2-norbornene, dicyclopentadiene, and combinations thereof. Most preferably, the non-conjugated diene is 5-ethylidene-2-norbornene (ENB).

Thus, according to some preferred embodiments, the one or more monomers comprise ethylene, propylene, and, optionally, one or more dienes. In some embodiments, the monomers consist of ethylene, propylene, and, optionally, one or more dienes. In particular embodiments, the monomers are ethylene, propylene, and a diene (such as ENB).

Adding Quenching Agent to Polymerization Effluent

The polymerization effluent according to some embodiments comprises: polymer product (e.g., ethylene-propylene copolymer, where the one or more monomers include ethylene and propylene; or, e.g., EPDM copolymer, where the one or more monomers include ethylene, propylene, and one or more dienes); active polymerization catalyst; unreacted monomers (selected from the one or more monomers polymerized in the solution polymerization process); and polymerization solvent. The polymerization solvent may be an organic liquid, preferably a liquid hydrocarbon, such as isohexane, hexane, cyclohexane, or other suitable hydrocarbon solvents for polymerization processes.

As shown in FIG. 1, quenching agent (preferably comprising methanol) is provided to the polymerization effluent 105 via a quench agent stream 112. According to some embodiments, as shown in FIG. 1, the quenching agent may comprise, consist essentially of, or consist of methanol (and/or ethanol, propanol, and/or butanol). In this context, "consist essentially of" means that less than 1 wt % impurities (i.e., compounds other than the methanol, ethanol, propanol, and/or butanol) are present in the quenching agent. For instance, per FIG. 1, methanol is provided from tank 115 via stream 116 and pumped as quench agent stream 112 to the polymerization effluent 105 using one or more quench pumps 113. Optionally, as shown in FIG. 1, the combined polymerization effluent and quenching agent may be provided to a quench mixer 120, to further aid mixing for greater extent of quenching reaction. The quenched polymer stream 130 exits the mixer 120.

Processes according to some embodiments include providing the quench agent (preferably, methanol) to the polymerization effluent such that the quench agent quenches the active polymerization catalyst in the polymerization effluent (i.e., the quench agent reacts with the active polymerization catalyst to render the catalyst inactive). The reaction of such embodiments proceeds in a manner that minimizes byproduct formation (e.g., gel formation) in the polymerization effluent (due, e.g., to unreacted monomer(s) polymerizing in the presence of the active polymerization catalyst prior to quenching). This minimized gel formation may be evaluated by extruding the solid polymer product (e.g., after separations and devolatilization) into a cast film, and performing optical surface analysis to count surface defects (which are caused by gels in the polymer product). The resulting surface defect count on the cast film may be reported as defects per m$^2$. This extrusion and surface defect count may be referred to simply as a "gel count." In summary, then, the quenching rate in processes according to some embodiments is such that a cast film extruded from the solid polymer product withdrawn from the process (following downstream separations such as devolatilization) exhibits mean gel count of 10 m$^{-2}$ or less, preferably 9, 8, or 7 m$^{-2}$ or less. Mean gel count is determined by taking the Student's t (0.05) mean of multiple (at least 10) surface defect counts under identical conditions.

Where the monomers include one or more polyenes, e.g., one or more dienes (such as one or more of those mentioned above), the quenching agent may react with such polyenes to produce a $C_{m+n}$ oxygenate, where m is the number of carbon atoms from the quenching agent (e.g., 1 for methanol) and n is the number of carbon atoms in the conjugated diene monomer, the dimer of the conjugated monomer, and/or oligomers of either with the α-olefin monomer(s) (e.g., ethylene and/or propylene). Thus, where the diene is ENB, having 9 carbon atoms, n is typically 9 or 18. In addition, unreacted quenching agent itself may be included among the oxygenates (e.g., unreacted methanol). Thus, the quenched polymer stream of such embodiments may comprise one or more $C_m$ and/or one or more $C_{m+n}$ oxygenates, e.g., it may comprise $C_1$ to $C_{40}$ oxygenates (such as $C_1$ to $C_{30}$, $C_{25}$, $C_{20}$, $C_{15}$ or $C_{10}$ oxygenates). Preferably, where the quench agent is methanol, the polymerization effluent of such embodiments comprises $C_{10}$ and $C_{19}$ oxygenates.

Separation, Recycle, and Adsorbents

Some embodiments further include recovering solid polymer product from the quenched polymer stream. In embodiments wherein the quenched polymer stream comprises oxygenates (whether unreacted quenching agent, products of acid-catalyzed reaction with dienes, or both), recovering the solid polymer product may further include separating the quenched polymer stream into a polymer product stream and a polymer recycle stream; and contacting at least a portion of the polymer recycle stream with one or more adsorbent beds to produce a treated recycle stream. The treated recycle stream may then be provided to the polymerization reaction zone. The polymer product stream may be subjected to further separations, e.g., devolatilization, so as to recover the solid polymer product. Any suitable devolatilization process may be utilized, such as extruder devolatilization, vacuum devolatilization, kneader devolatilization, and the like. See, e.g., U.S. Pat. Nos. 6,881,800 and 8,524,859; U.S. Patent Publication No. US2011/0172383; and WIPO Publication No. WO2011/087730 for descriptions of some suitable devolatilization processes and equipment. In some preferred embodiments, devolatilization is carried out using a kneader, such as that described in U.S. Pat. No. 8,524,859.

The separation of the quenched polymer stream may be effected by any suitable means, and preferably results in a polymer-rich stream and a polymer-lean stream. One suitable means of such separation includes lower critical solution temperature (LCST) separation, such as is taught in U.S. Pat. No. 6,881,800. As shown in FIG. 1, the quenched polymer stream 130 is separated using an LCST separator 150, from which exit the polymer recycle stream 155 (as the polymer-lean phase) and the (polymer-rich) polymer product stream 157. Optionally (not shown in FIG. 1), heat exchange means may be provided on the quenched polymer stream 130 prior to separation. Such heat exchange may helpfully put the polymer stream in conditions more suitable to separation into polymer-rich and polymer-lean phases (e.g., cooler temperatures closer to or at the cloud point of the quenched polymer stream). Furthermore (also not shown in FIG. 1), the polymer product stream 157 may be passed to devolatilization (e.g., a kneader, devolatilization extruder, vacuum devolatilizer, or other suitable devolatilization means).

As noted, and with further reference to FIG. 1, the polymer recycle stream may be contacted with one or more adsorbent beds 170 to produce the treated recycle stream 175, which may then be combined with a polymer feed stream 180, comprising the one or more monomers, and fed to the polymerization reaction zone 190. (Alternatively, not shown in FIG. 1, the treated recycle stream may be provided directly to the polymerization reaction zone 190, separately from the feed stream 180.)

The one or more adsorbent beds preferably include a zeolitic molecular sieve and/or a hybrid zeolite in alumina. According to some embodiments, a zeolitic molecular sieve is desirable for removing water and lower oxygenates (e.g., $C_1$ to $C_6$ oxygenates), while the hybrid zeolite in alumina is desirable for removing higher oxygenates, such as $C_8$ to $C_{40}$ oxygenates, or $C_{12}$ to $C_{30}$ oxygenates, most preferably $C_{18}$ oxygenates. Any of the zeolitic molecular sieves and/or hybrid zeolite in alumina adsorbent beds described in Paragraphs [0030]-[0036] of WIPO Patent Publication WO2014/209813 (corresponding to U.S. Pat. No. 9,382,344, noted previously) may be suitable for use in treating the recycle stream of such embodiments. Such description is accordingly incorporated by reference herein.

For instance, as noted in WO2014/209813, a suitable zeolitic molecular sieve may comprise material selected from the group consisting of zeolite X, zeolite Y, zeolite A, faujasite, mordenite, ferrierite, and mixtures thereof. Zeolitic molecular sieves for removing water are well known in the art and are available from, for example, BASF and other manufacturers. The zeolitic molecular sieves preferably have a pore size within the range of from 2 or 4 Å to 6 or 8 or 10 or 12 Å, where desirable ranges may include ranges from any lower limit to any upper limit.

The "hybrid zeolite in alumina" may be a zeolite that is in a matrix of alumina. The hybrid zeolite in alumina may have a surface area within the range of from 60 or 80 m$^2$/g to 110 or 120 or 140 m$^2$/g, where desirable ranges may include ranges from any lower limit to any upper limit. The hybrid zeolite in alumina may have a pore volume within the range from 0.30 or 0.35 or 0.40 ml/g to 0.48 or 0.50 or 0.54 ml/g, where desirable ranges may include ranges from any lower limit to any upper limit. A commercial example of a useful hybrid zeolite in alumina is zeolite UOP AZ-300™ from UOP.

In some embodiments, at least one of the adsorbents is binderless. For example, the zeolitic molecular sieve may be binderless and/or the hybrid zeolite in alumina may be binderless. A binderless zeolite is a zeolite that contains less than 10 wt % binder, or less than 7 wt % binder, or less than 5 wt % binder, or less than 2 wt % binder, where the binder content of the zeolite is measured by X-ray diffraction. In some embodiments, the zeolite is substantially free of binder and contains less than 2 wt % binder. Using a binderless zeolite can allow for the creation of less oxygenates in the recycle stream, as the unreacted conjugated or non-conjugated diene monomer in the recycle stream and quenching agents, can react with the binder in a zeolitic material to form oxygenates. Further, in addition to the benefit that substantially no oxygenates are generated by the (binder) in the zeolite body, using a binderless zeolite can provide increased capacity per weight of the material for removing water/quenching agent. An example of a binderless zeolite that may be used is Zeochem Purmol® 3ST and Zeochem Purmol® 3STH.

The various descriptive elements and numerical ranges disclosed herein for the polymerization process, and in particular, the method of removing oxygenates and water from the recycle stream, and the adsorbents used therein, can be combined with other descriptive elements and numerical ranges to describe the invention(s); further, for a given element, any upper numerical limit can be combined with any lower numerical limit described herein. The features of the invention are described in the following non-limiting examples.

EXAMPLES

Two different polymerization reactions were run. In both cases, ethylene, propylene, and ENB were fed to a solution polymerization reactor in isohexane solvent. Metallocene catalyst was provided to the reactor, and polymerization carried out under identical conditions (temperature, pressure) in the solution reactor. According to Run A, water was injected into the polymerization effluent drawn from the polymerization reactor; while in Run B, the water flow to the polymerization effluent was shut off, and instead methanol was injected into the polymerization effluent.

In both cases, the quenched polymer stream was separated into polymer-rich and polymer-lean phases by LCST separation. The polymer-rich phase was recovered and further devolatilized using a kneader so that a solid polymer product was recovered.

Gel count analysis was conducted on each solid polymer product (i.e., Run A product and Run B product). Run A and Run B products were extruded into a cast film, in which gels in the polymer product show up as surface defects. An optical imaging system (available from Optical Control System GmbH) was connected to the cast-film line and used to identify and count the number of surface defects in each extruded film over a given surface area (and reported in counts per $m^2$). The higher the number of surface defects detected over the given area, the higher the gel count.

Figure 2:
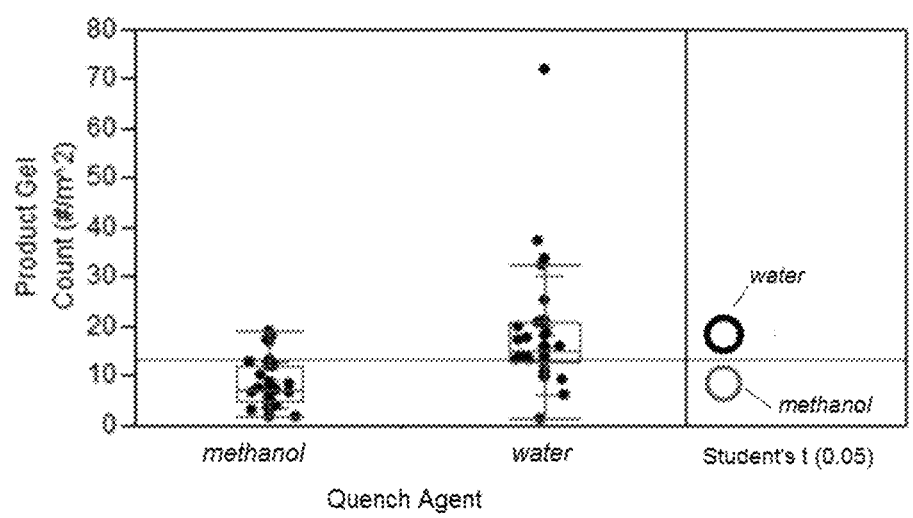
FIG. 2 is a statistical comparison of gel counts for EPDM product made using methanol quench agent vs. conventional water quench agent.

The results of the gel count tests for each run are charted in FIG. 2 (again, reported as counts per $m^2$), as are the Student's t statistical mean values for these gel counts (calculated by the JMP® 12 software program available from SAS Institute Inc.). Statistical mean circles for each set of data (gel counts of the extruded film of Run A; gel counts of the extruded film of Run B) are graphed in FIG. 2, which circles were output by the JMP® 12 program (an explanation of how the circles are graphed can be found at Statistical Details for the Oneway Platform, JMP, available at http://www.jmp.com/support/help/Statistical_Details_for_the_Oneway_Platform.shtml).

As shown in FIG. 2, the mean gel counts for Run B (labeled as "methanol" in FIG. 2) were significantly lower than the mean gel counts for Run A, indicating the successful reduction of the production of gels in the polymerization process, indicating that uncontrolled post-reactor polymerizations were successfully reduced by the use of methanol as a quench agent.

All documents described herein are incorporated by reference herein. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

The invention claimed is:

1. A process comprising:
   (a) feeding one or more monomers and a polymerization solvent to a solution polymerization reaction zone;
   (b) polymerizing at least a portion of the one or more monomers in the presence of a polymerization catalyst in the solution polymerization reaction zone;
   (c) withdrawing a polymerization effluent from the polymerization reaction zone,
      wherein the polymerization effluent comprises active polymerization catalyst and one or more unreacted monomers;
   (d) adding a quenching agent which consists of methanol and water to the polymerization effluent so as to quench the active polymerization catalyst in the polymerization effluent, thereby forming a quenched polymer stream; and
   (e) recovering solid polymer product from the quenched polymer stream,
      wherein the quenching agent quenches the active polymerization catalyst at a quenching rate such that the solid polymer product, when extruded as a cast film, has a mean gel count of 10 $m^{-2}$ or less.

2. The process of claim 1, wherein recovering solid polymer product comprises: (I) separating the quenched polymer stream into a polymer product stream and a polymer recycle stream; and (II) devolatilizing the polymer product stream so as to recover the solid polymer product.

3. The process of claim 2, further comprising: (I-a) contacting at least a portion of the polymer recycle stream with an adsorbent bed comprising at least two adsorbents so as to produce a treated recycle stream.

4. The process of claim 1, wherein the one or more monomers comprise one or more polyenes.

5. The process of claim 4, wherein the one or more monomers comprise ethylene, propylene, and a diene.

6. The process of claim 4, wherein the quenched polymer stream comprises $C_{10}$ and $C_{19}$ oxygenates.

7. The process of claim 3, wherein the adsorbent bed comprises a zeolitic molecular sieve and a hybrid zeolite in alumina.

8. The process of claim 7, wherein the adsorbent bed further comprises at least one silica adsorbent.

9. The process of claim 7, wherein the zeolitic molecular sieve comprises material selected from the group consisting of zeolite X, zeolite Y, zeolite A, faujasite, mordenite, ferrierite, and mixtures thereof.

10. The process of claim 1, wherein the quenching rate is such that the solid polymer product has a mean gel count of 9 $m^{-2}$ or less.

* * * * *